United States Patent [19]

Turner et al.

[11] Patent Number: 5,213,508

[45] Date of Patent: May 25, 1993

[54] TEXTSCAN

[76] Inventors: Maurice O. Turner; Marjorie G. Turner, both of 2300 Lexington Ave. S., Mendota Heights, Minn. 55120

[21] Appl. No.: 628,838

[22] Filed: Feb. 25, 1991

[51] Int. Cl.[5] .............................................. G09B 17/02
[52] U.S. Cl. ..................................... 434/183; 434/178;
434/365; 40/343; 40/356
[58] Field of Search ......................... 434/118, 322–327,
434/314, 315, 335, 353–358, 360–363, 365, 429,
178–183; 178/78; 358/75, 86, 185; 382/60, 68;
340/706, 731; 364/419; 40/343, 351, 352, 356,
348, 364; 400/54, 279, 6, 318; 250/221, 227.13

[56] References Cited

U.S. PATENT DOCUMENTS

| | | | |
|---|---|---|---|
| 1,988,973 | 1/1935 | Shroitman | 40/351 |
| 2,162,766 | 6/1939 | Taylor | 434/182 |
| 2,958,270 | 11/1960 | Higonnet et al. | 40/343 |
| 3,262,219 | 7/1966 | Bristol | 434/183 |
| 3,264,759 | 8/1966 | Simpson | 434/183 |
| 3,366,794 | 1/1968 | Alvarez | 382/60 X |
| 3,449,850 | 6/1969 | Eckert | 40/356 |
| 3,707,778 | 1/1973 | McGourty | 434/335 |
| 3,763,989 | 10/1973 | Goldman | 40/343 X |
| 3,800,439 | 4/1974 | Sokolski et al. | 434/355 |
| 3,803,971 | 4/1974 | del Castillo | 40/356 |
| 3,810,317 | 5/1974 | Rosenbaum et al. | 434/325 |
| 3,837,093 | 9/1974 | Sykora | 434/325 |
| 3,932,948 | 1/1976 | Goddard et al. | 434/324 X |
| 4,272,756 | 6/1981 | Kakumoto et al. | 382/67 |

FOREIGN PATENT DOCUMENTS 1591174 6/1981 United Kingdom ................. 40/343

Primary Examiner—Richard J. Apley
Assistant Examiner—Joe H. Cheng
Attorney, Agent, or Firm—Merchant, Gould, Smith, Edell, Welter & Schmidt

[57] ABSTRACT

An improved text scanning apparatus is disclosed. A support structure retainably holds a sheet of material to be scanned in snug planar engagement with an upright copyboard support surface. Light sources selectively enable illumination of the sheet from overhead or through the sheet. Horizontally and vertically movable masks overlie the sheet material and traverse over the material in precise operator preselected incremental timed manner, to highlight the text according to the operator's selections. The system provides for full automatic, semiautomatic or manual modes of operation.

17 Claims, 12 Drawing Sheets

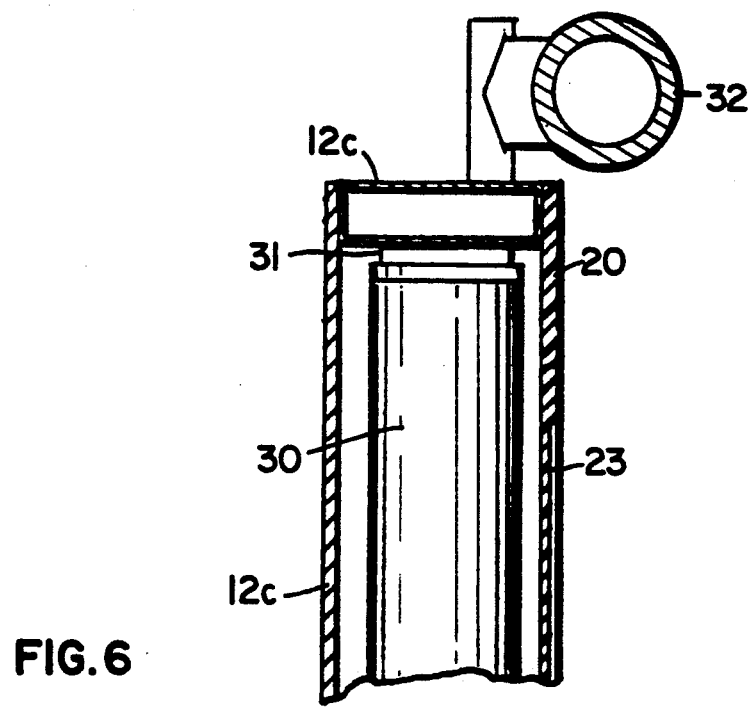
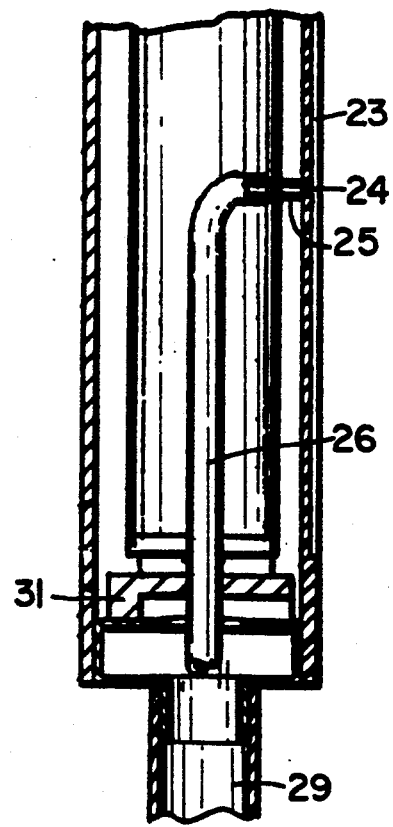
FIG.6

TEXTSCAN

FIELD OF THE INVENTION

This invention relates generally to text-following guide apparatus, and more specifically to an automated apparatus for scanning text along horizontal and vertical axes under programmable operator control.

BACKGROUND OF THE INVENTION

There has been a long-felt need for practical, efficient, and automated guide apparatus capable of scanning hard copy text and/or data in a programmable, user-friendly manner. The most obvious need for such apparatus has been by secretaries or typists who are typing or keyboard entering information or data on a typewriter or into a computer or wordprocessor, from written or text copy.

A number of relatively simple typing copyholders have been used in the past. Early such copyholders were simple mechanical stands generally configured to hold the copy being viewed in upright manner, for ease of viewing by the user. Most such mechanical stands included a ruler or text highlighting bar extending horizontally across the copy, that served the dual purpose of holding the copy against the upright stand and of keeping track of or highlighting the particular line of text being viewed by the operator. Such mechanical units required the operator to physically move the highlighter guide along the copy, or to physically push an actuating bar or lever connected to the guide, to vertically move or step the guide along the copy.

Subsequent efforts at automating such text highlighting apparatus included structures which initiated movement of the guide bar by means of a switch on the keyboard, or by vibration or sound sensors that responded to the presence or absence of typing activity. One such device continuously moved or scrolled the copy relative to a fixed highlighting guide in response to sensed typing vibration. Another acoustically sensed a predetermined time interval of absence of typing activity, and thereafter continuously moved the highlighting guide until the operator resumed typing of the next line of highlighted text. Such apparatus is disruptive to the operator's continuous typing or keyboard entry process, since the operator must pause at the end of each line of entered text in order to actuate movement of the highlighter guide to the next line.

All of such prior art guide scanning structures have been too cumbersome, inefficient, noisy or nonautomated, to be effective and practical for use by an operator. They generally require the operator to disrupt his or her keyboard entry in order to initiate movement of the guide to the next line and/or require the operator to wait for movement of the guide to the next line "after" completion of a line of text as, for example, in the case of sound sensor activated units. None of such apparatus is anticipatory in nature or enables presentability of the guide motion according to an operator's predetermined capabilities or desired text viewing speed.

Such prior art text viewing guides are generally single-purpose in nature. They typically are designed to isolate and scan full "lines" of text, and are not generally adaptable to scan horizontally along a highlighted line of text. Further, they are typically not designed to isolate or scan "columns" of text or data as may be required, for example, by an accountant working with spread sheets or the like. Other uses for such hard copy scanning guide apparatus which are not simultaneously accommodated by the prior art special purpose highlighting structures include such activities as scanning music and scanning written or typed copy for verbal presentation, such as for a speech or other oral presentation. In public speaking, it is important for the orator to provide a smooth presentation to his/her audience without the distraction of shuffling through papers or notes or the disruption caused by continuous need by the orator to relocate his/her place in the notes.

The present invention addresses the above-mentioned needs and shortcomings of the prior art scanning guide structures by means of an efficient, flexible, versatile and user-friendly apparatus. The present invention is particularly applicable in today's era where communication, speed and accuracy in transferring information from data sheets and documents to computers and/or wordprocessing systems are critical. This is particularly true in the medical, high technology, military, education, political, financial and entertainment fields. In such applications, the present invention helps to eliminate human error and increases transferring efficiency by guiding the user's eyes through the text at a programmable speed and according to other options selectable by the user. The present invention can increase the productivity of a person manipulating data on a spread sheet or entering data into a computer by virtue of its unique ability to isolate blocks of data on the copy being viewed. The invention is readily usable by musicians to guide them through their sheet music during performances. The invention is also readily usable by orators, to produce a smooth comfortable delivery from written information, by helping to guide the user's eye through the text while speaking and by providing the orator with flexibility to pause and to change the delivery speed for elaborating on portions of the presentation. The invention helps to eliminate distractions and confusions in the speaker's delivery, thus enhancing audience attention.

SUMMARY OF THE INVENTION

The present invention provides an automated programmable text scanning apparatus, with flexibility of use by multiple diverse users such as keyboard operators, accountants, orators and musicians. The text scanning apparatus of this invention combines a programmable horizontal and vertical text tracking/scanning apparatus that is readily adaptable to the operator's or reader's capabilities and/or needs. The text scanning apparatus of this invention includes means for selectively isolating hard copy data or text in either or both the horizontal and vertical directions. The apparatus includes means for accepting programmable operator entry of a number of user-friendly options and a visual display for assisting in the entry and verifying of such entered options. The apparatus accepts information to control scanning of the document through the input of such parameters as: page (document) size, number of lines per page, number of characters per inch on a line, number of lines to be moved per increment in the vertical scanning direction, number of columns to be moved per increment in the horizontal scanning direction, the selection of scanning direction(s), the time interval for respective scanning guide movements and location of the starting or "home" position for the scanning guides. The invention also includes recall memory for enabling return of the horizontal and vertical guides to the "home" position following complete scanning of a document, and for repetitive scanning motion of successive documents. The apparatus is programmable to remember multiple parameters for different users.

According to one embodiment of the invention, there is provided a text scanning apparatus comprising:

(a) support surface means for retainable holding a sheet of text-containing material;

(b) first mask means operatively connected to the support surface means for moving along a first axis relative to the sheet of material held thereby, wherein the first mask means is arranged and configured to align with and isolate the text generally along a first direction across the sheet;

(c) second mask means operatively connected to the support surface means for moving along a second axis, generally orthogonal to the first axis, relative to the sheet material held thereby, wherein the second mask is arranged and configured to align with and to isolate the text generally along a second direction across the sheet;

(d) first drive means operatively connected with the first mask means for moving the first mask means in timed incremental manner in the direction of the first axis; and (d) second drive means, independent of the first drive means, operatively connected with the second mask means for moving the second mask means in timed incremental manner in the direction of the second axis; whereby the first and the second mask means cooperatively move in timed sequence to isolate blocks of the text of the sheet material.

According a further aspect of the invention, there is provided such a text scanning apparatus wherein the timed incremental movement of the second mask means is of a nature such that the second mask means appears to continuously move in the direction of the second axis. According yet another aspect of the invention, operator programmable circuit means are provided which are operatively connected with the first drive means for enabling programmable control of the first drive means such that the first mask means is moved in response to the programmable control. According to yet another aspect of the invention, the programmable circuit means is also operatively connected with the second drive means for enabling programmable control of both the first and the second drive means, wherein the first and second mask means are moved in response to the programmable control. According to yet another aspect of the invention, there is provided a text scanning apparatus as described above, wherein the programmable circuit means includes means for selectively operating either the first and/or the second drive means in automatic, semiautomatic or manual modes of operation.

According to a preferred embodiment of the invention, there is provided a text scanning apparatus having such first and second mask means and such first and second drive means operatively connected respectively thereto, wherein the support surface means includes an upright chassis configured to rest on a generally horizontal surface defining a generally planar copyboard for engagably supporting the sheet material in a generally upright manner relative to the horizontal surface. The invention also contemplates that the support surface means includes vacuum means for retainably holding the sheet of material in snug engagement with the support surface means, across the entire surface of the sheet material. The invention further contemplates the provision of light means for illuminating the sheet material carried by the support surface means.

While the invention will be described with reference to a preferred embodiment thereof which illustrates a specific configuration for a text material supporting chassis, it will be understood by those skilled in the art, that many other configurations for the support means can be configured within the spirit and intent of this invention. Further, while the invention will be described with respect to a preferred embodiment configuration which uses specific hardware and accompanying programs for implementing the programmable selection features of the invention, it will be understood by those skilled in the art, that any appropriate circuit means could be used to implement the programmable features of this invention. Further, while the invention will be described with respect to a preferred embodiment thereof which utilizes guide masks which move in both first and second (i.e., vertical and horizontal) directions, the invention is not limited to movement in "horizontal" and "vertical" directions, but can be used to highlight and isolate text or data in any two or more directions. These and other variations of the invention will become apparent to those skilled in the art upon a more detailed description of the invention.

BRIEF DESCRIPTION OF THE DRAWING

Referring to the Drawing, wherein like numerals are used to designate like parts throughout the several views:

FIG. 6 is an enlarged cross-sectional view, with portions thereof broken away, generally taken along the Line 6—6 of FIG. 2 illustrating the vacuum and lighting portions of the apparatus;

DESCRIPTION OF THE PREFERRED EMBODIMENT

Figure 1:
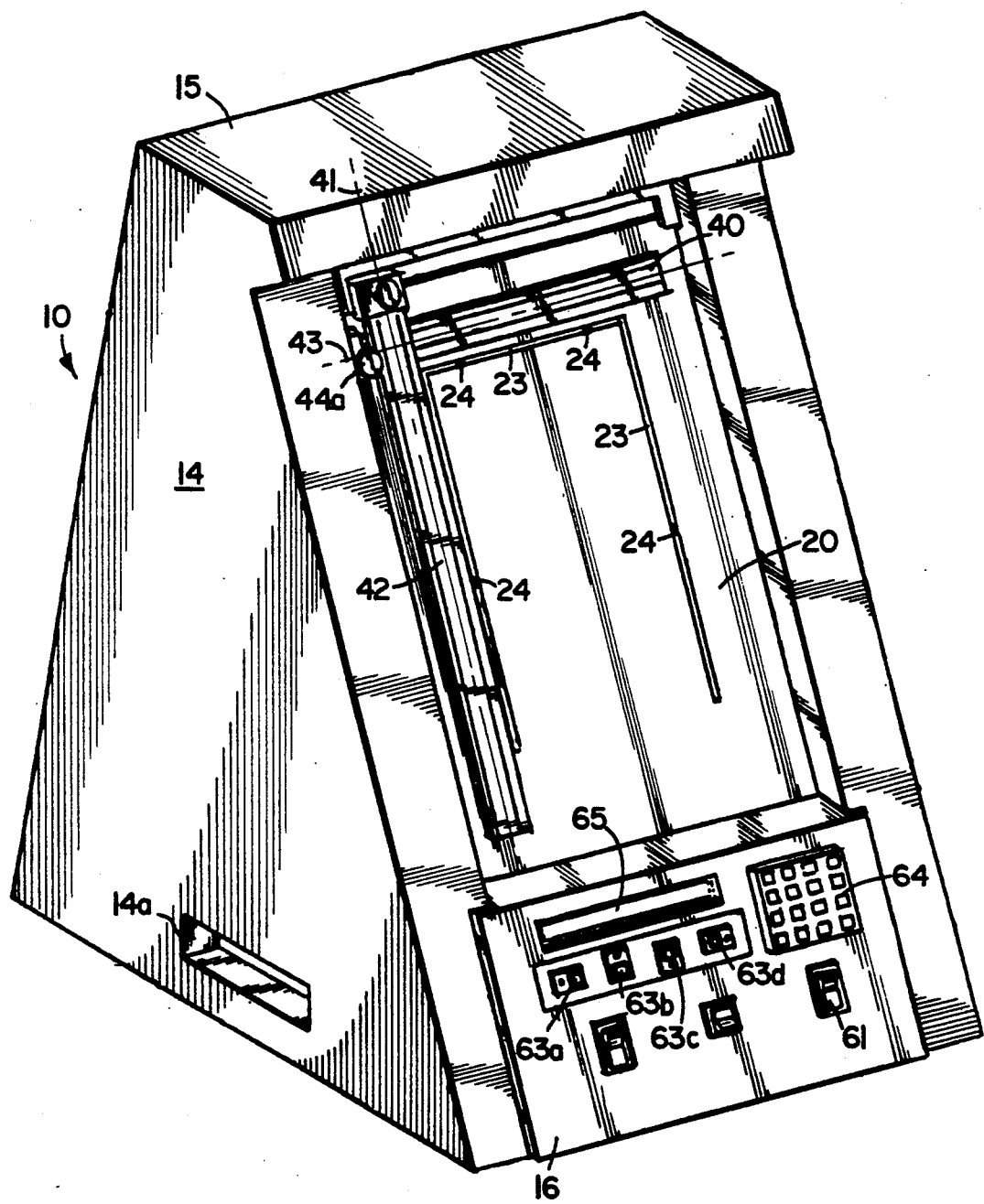
FIG. 1 is a front and left side perspective view of a text scanning apparatus configured according to the principles of this invention.
Figure 2:
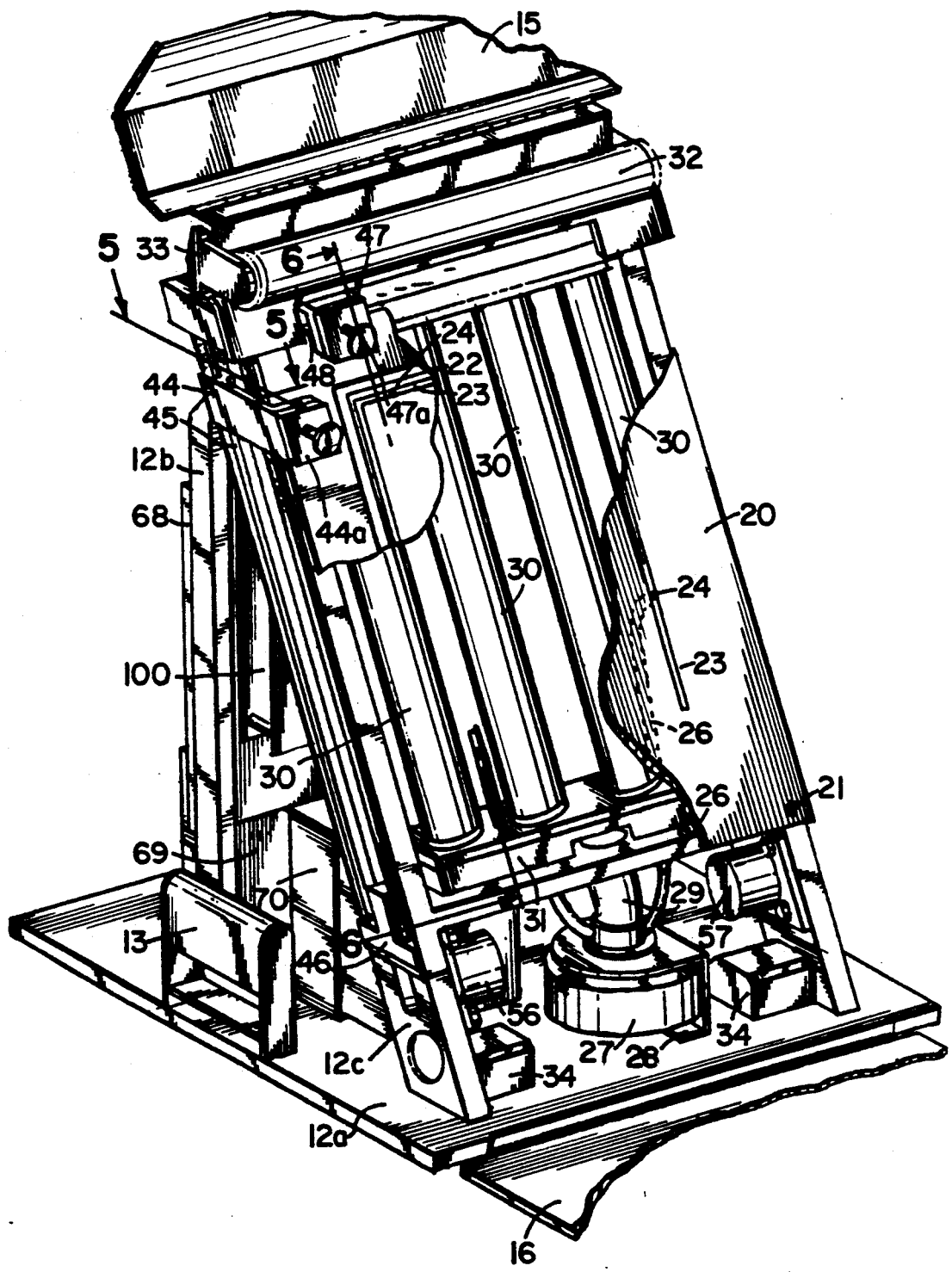
FIG. 2 is a partial fragmented view of the text scanning apparatus of FIG. 1, as it would appear with the outer cover thereof removed, and with portions of the copyboard surface thereof broken away to illustrate underlying structure.

Referring to the Figures, the mechanical portions of a preferred embodiment implementation of the invention are collectively disclosed in FIGS. 1-7. The mechanical portions of the preferred embodiment generally include an upright support structure for holding sheets of printed or written data or text, generally illustrated at 10. The support structure 10 generally includes a support chassis 12, generally having a lower support base 12a, a mounting standard 12b connected to the base 12a and extending vertically upward therefrom, and a copyboard mounting frame 12c mounted at an angle between the support base 12a and the vertical mounting standard 12b. A pair of handle brackets 13 are mounted to the support piece 12a on either side thereof and extend vertically upward therefrom, to permit grasping and ready movement of the entire stand assembly 10. The copy support structure includes an outer cover or shell 14, constructed in the preferred embodiment, of ⅛ inch light weight acrylic plastic material which is configured to cooperatively enclose and attach to the chassis 12. The outer cover 14 includes a pair of oppositively disposed recessed openings 14a for permitting access to the handle brackets 13 through the shell 14. The outer cover 14 further has an opening defined through its rear wall member (not illustrated) through which power connections can be made to electrical components mounted within the chassis (as hereinafter described in more detail). The outer cover defines a generally rectangular opening for exposing a copyboard support surface (hereinafter described), as illustrated in FIG. 1. An upper cover member 15 is hingeably connected to the copyboard mounting frame 12c of the chassis 12, to close the upper portion of the stand assembly and acts as an upper panel light deflector to reduce light glare to the user, as is described in more detail hereinafter. A front panel member 16 is hingeably connected to support base 12a (as is illustrated in FIG. 2) and pivotally swings into operative position as illustrated in FIG. 1 to close the lower portion of the stand configuration, and to define a front control panel for the operator selection input switches, as hereinafter described in more detail.

A generally planer copyboard member 20 is secured to the copyboard mounting frame 12c by appropriate fastening means, as illustrated by the fastener 21 in FIG. 2. The forward face of the copyboard panel member 20 defines a planer engagement surface for uniformly supporting a page or sheet of material (not illustrated) containing text or data to be scanned by the apparatus. The back surface (i.e. that surface facing the inner structure of the chassis) of the copyboard panel member 20 acts as a reflector member for defusing light within the chassis structure, as hereinafter described in more detail. The copyboard panel member 20 is, in the preferred embodiment, constructed of translucent material through which light passes, for illuminating sheet materials placed on the outer surface of the copyboard panel. The outwardly directed surface of the copyboard panel 20 further defines a generally rectangle recessed area, illustrated at 21 in FIG. 2 for guiding alignment of paper or documents on the copyboard panel member 22. The copyboard panel member 20 further includes a generally inverted, U-shaped grove or recess 23 in the outer surface of the copyboard panel 20 which defines a vacuum channel (as hereinafter described in more detail). A plurality of holes 24 are formed through the copyboard panel member 20 and open into the bottom of the vacuum groves 22 and are aligned and connected with hose connectors 25 extending from the back surface of the copyboard panel member 20, as illustrated in more detail in FIG. 6. The hose connectors 25 are operatively connected by means of a plurality of vacuum hoses 26 to the central vortex portion of a fan 27 which is operatively mounted to the support base 12a by means of a mounting bracket 28. The fan 27, when operating, creates a vacuum which draws air through the vacuum hoses 26, which in turn draws air into the groves 23 in the copyboard panel 20, through the holes 24—forming a vacuum between any document supported on the copyboard panel 20 and the upper surface of the copyboard panel 20, to securely and uniformly hold the document in place against the outer surface of the copyboard panel 20.

A larger vacuum hose 29 extends from the central portion of the fan 27 toward the inner-cavity portion of the chassis, for producing current flow within the inter-cavity from top to bottom, to provide cooling to the electrical components and lighting members housed by the chassis within the internal cavity.

A plurality of fluorescent lights 30 are mounted by means of a pair of brackets 31 to the copyboard mounting frame 12c. In the preferred embodiment, four lights 30 are mounted in generally parallel arrangement behind the copyboard panel member 20, and provide lighting of a document supported by the copyboard panel 20, through the panel member. An upper light 32 is mounted by means of a pair of bracket members 33, in generally horizontal manner across the top of the copyboard mounting frame 12c, and such that light emitted from the upper fluorescent light 32 projects downwardly over the outer surface of the copyboard panel 20 and any documents supported thereby, as reflected by the upper cover 15. Therefore, the lower lights 30 emit light through the copyboard panel member 20 while the upper light 33 casts light over the outer surface of the copyboard. The electrical ballast circuitry for the fluorescent lights 30 and 32 as illustrated at 34, is mounted to the support base of 12a of the chassis. All five of the lights are cooled by means of the fan 27, as previously described. In the preferred embodiment, the upper light 32 can be turned on independently of the lower lights 30. Generally, the upper light 32 will also be illuminated, to cast light over the upper surface of the copyboard panel 20. However, the lower lights 30 would only be illuminated in those instances wherein the document placed on the copyboard surface contains print only on one side of the document. For those instances wherein the document has text or copy on both sides thereof, the lower lights 30 would be turned off so as not to project light through the document.

A pair of highlighting mask members 40 and 42 are mounted (as hereinafter described) to move in overlying relationship and relative to the upper surface of the copyboard panel member 20. The vertical mask member 42 is configured to move in the horizontal ("x" axis 43) direction. The horizontal mask 40 is connected to move generally in the vertical (i.e. "y" axis 41) direction (see FIG. 1). The horizontal mask 40 is mounted to a guide bracket 44 by means of a cursor clamp portion thereof 44a. The guide bracket 44 is mounted for slidable movement along a pair of guide rod members 45 for constrained one-degree motion in the y-axis direction the vertical guide rod members 45 are accurately mounted in parallel spaced-apart relationship at their respective ends by a pair of vertical rod mounting brackets 46 which are secured to the side standards of the copyboard mounting frame 12c, as illustrated in FIG. 2. The upper vertical rod mounting bracket 46 is not illustrated in FIG. 2, but is understood to be the same as shown for the lower mounting bracket, except reversed in orientation. The vertical mask 42 is mounted to a guide bracket 47 by means of a cursor clamp portion thereof 47a. The guide bracket 47 is mounted for slidable movement along a pair of guide rod members 48 (only one of which is illustrated in FIG. 2) for constrained one-direction motion in the x-axis direction, in identical manner as was previously described with respect to mounting and movement of the horizontal guide bracket 44. The horizontal guide rod members are accurately mounted in parallel spaced-apart relationship to one another at the respective ends by means of a pair of horizontal rod mounting brackets (not illustrated, but understood to be identical in function and nature to the vertical rod mounting brackets 46 previously described), which are secured to the upper horizontal portion of the copyboard mounting frame 12c. The vertical guide bracket 47, as constrained for movement by its associated horizontal guide rods 48, moves the vertical mask 42 horizontally along and over the upper surface of the copyboard panel member 20. The horizontal and vertical masks 40 and 42 can comprise any type of material suitable for locating, isolating and/or highlighting data or indicia on a document carried by the copyboard panel 20. In the preferred embodiment masks 40 and 42 are constructed of transparent plastic material having longitudinally extending lines there along for respectively isolating horizontal and vertical portions of the text or indicia on a document or page held by the copyboard panel 20.

Figure 3:
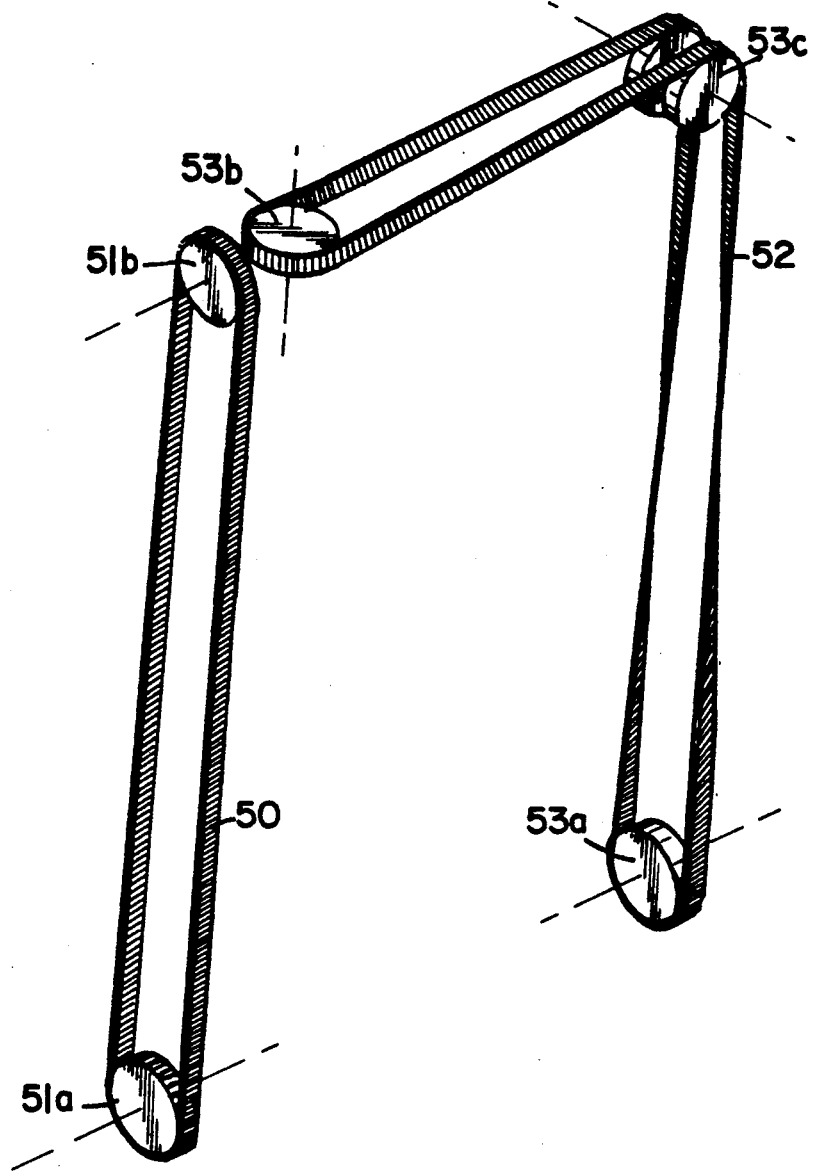
FIG. 3 is a diagrammatic enlarged view of the pulley and belt portions of the text scanning apparatus mask drive portions illustrated in FIG. 2.
Figure 4:
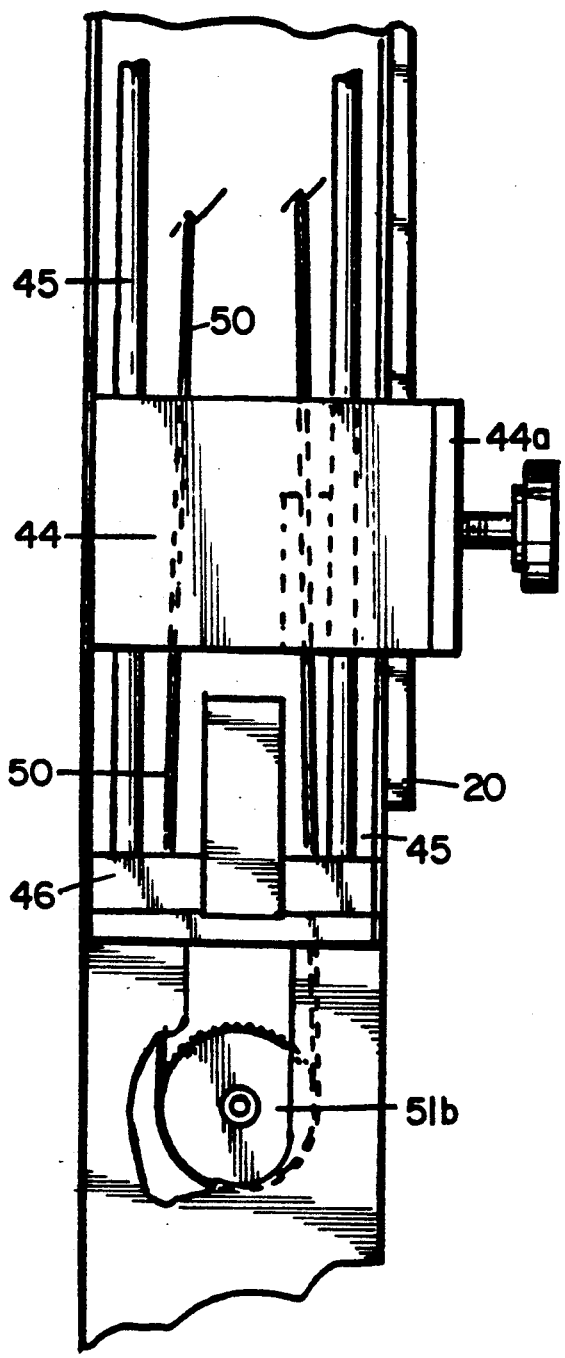
FIG. 4 is an enlarged fragmental side elevation view with portions thereof broken away illustrating the pulley and belt configuration for driving the vertical movement mask portion of the system.
Figure 5:
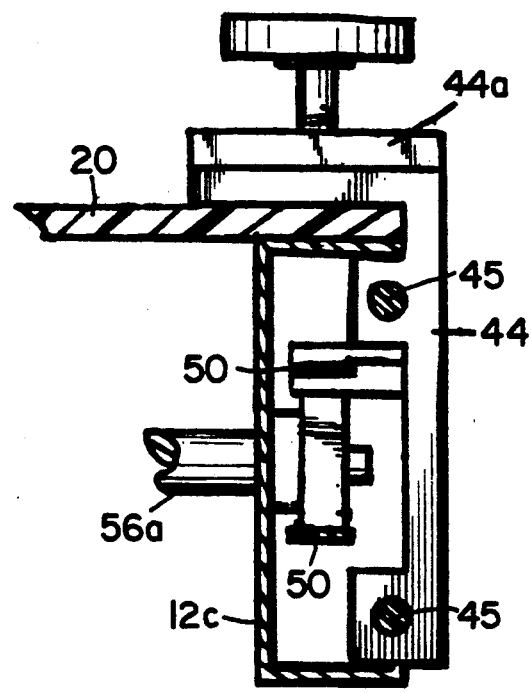
FIG. 5 is a cross-sectional view, with portions thereof broken away, generally taken along the Line 5—5 of FIG. 2, illustrating a portion of the drive mechanism for the vertically movable mask portion of the apparatus.
Figure 7:
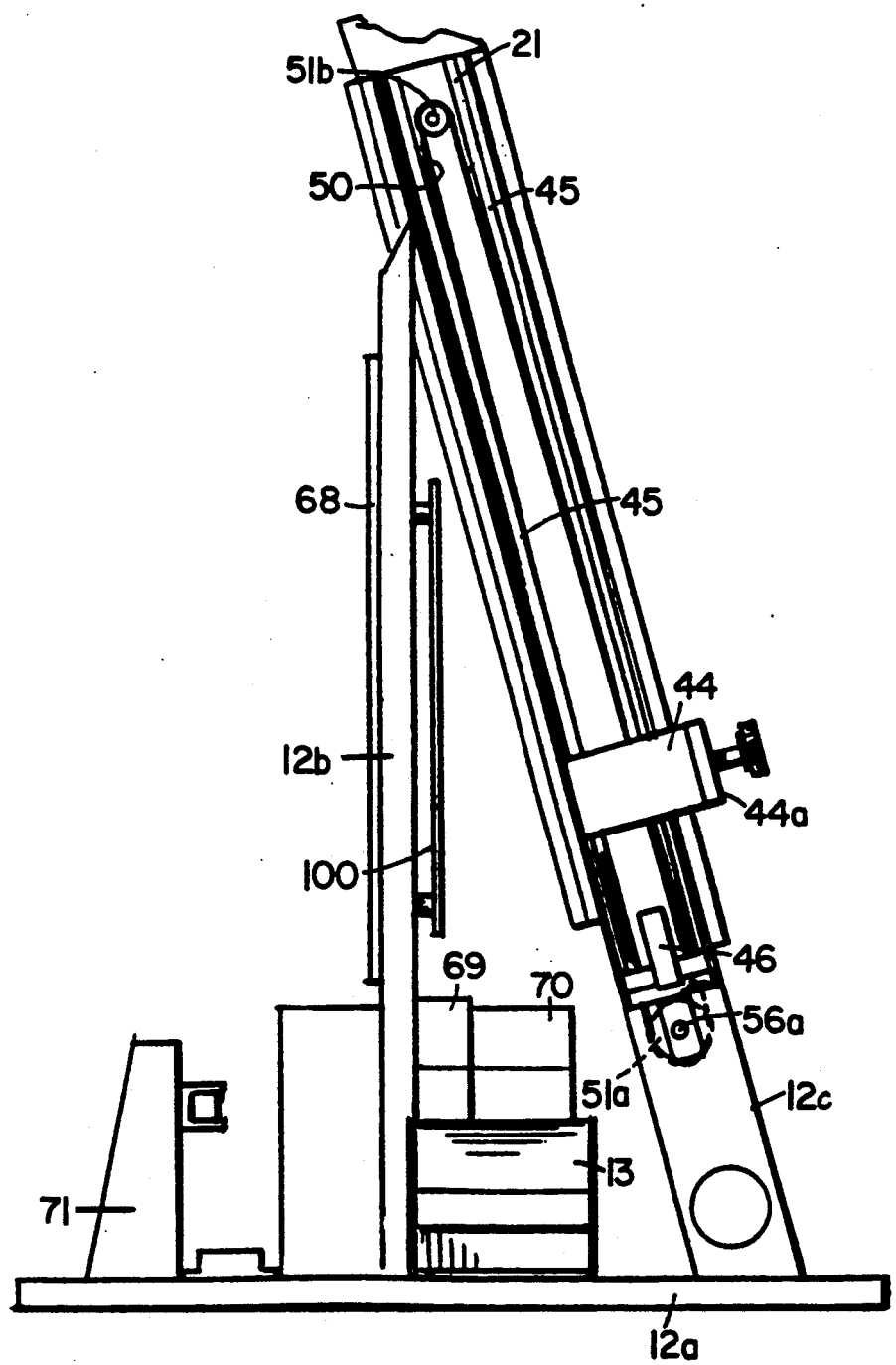
FIG. 7 is a left elevational view of the apparatus of FIG. 2.

The horizontal and vertical guide brackets 44 and 47 are respectively connected for movement by means of a pulley and belt configuration, the orientation of which is generally illustrated in FIG. 3. The horizontal guide bracket is connected to a continuous belt 50 and is entrained over lower and upper pulleys 51a and 52b respectively, which are mounted for rotation to the copyboard mounting frame 12c, as illustrated in FIG. 7. The horizontal guide bracket 44 is connected to one leg of the belt 50 and moves therewith as directed by the lower drive pulley 51a. Similarly, the vertical guide bracket 47 is connected to a belt and pulley arrangement which directs its movement along the horizontal axis. A second continuous belt member 52 is entrained between a pair of end pulleys 53a and 53b and over an intermediate idler pulley 53c. The vertical guide bracket 47 is directly connected to one leg of the belt 52 and is constrained for movement thereby. The pulleys 53a–53c are rotatably mounted to the copyboard mounting frame 12c.

The lower pulleys 51a and 53a are respectively connected to a pair of precision geared stepper motors 56 and 57, respectively. Where illustrated in the Figures, the output drive shafts of the geared stepper motors 56 and 57 respectively are illustrated at 56a and 57a respectively. Energization of the stepper motors 56 and 57 is precisely controlled by means of motor drive circuitry (hereinafter described in more detail) such that movement of the respective horizontal and vertical masks 40 and 42 can be precisely controlled. Incremental (i.e. "stepped") movement of the masks 40 and 42 is achieved by the duration of energization of the respective geared stepper motors 56 and 57.

Referring to FIG. 1, the operator input and display functions of the system are provided on the lower control panel 16 of the system. Power to the electronic components of the system is provided by means of the On/Off switch 60. Power to the two sets of lights 30 and 32 is controlled by means of the toggle switch 61. In one position, switch 61 energizes both sets of lights; whereas, in its second position, switch 61 energizes only the upper light 32. The switch 63 is operatively connected to energize the fan motor 27 for providing cooling airflow through the interior of the chassis and for providing vacuum suction to the vacuum groves 23, for holding a document in place on the copyboard panel surface 20. Four manual directional switches 63 energize the stepper motors 56 and 57 to move the selected mask 40 or 42 in the direction indicated on the direction switches. Switch 63a moves the vertical mask 42 to the right, and switch 63d moves the vertical mask 42 to the left. Switch 63b moves the horizontal mask 40 downward, while switch 42c moves the horizontal mask 40 in the upward direction.

Operator program and selection input is provided to the electrical system by means of a 16 pad keyboard panel 64. The 16 pad Mode Control Panel includes numerical entry keys "0–9", alphabetical keys "A–D", an "Entry/Hold/Resume" key and a "Home" key. In general, the "0–9" numerical keys are for inputting user specific parameters during the programming sequence. The "#1" numerical key is also used to initiate the programming sequence. The "A–D" alphabetical keys are used to select or change the operational mode of the system. The "Enter/Hold/Resume" key is used in the Full Automatic Mode to halt or the hold the operation of the text scanning system until the user wishes to continue. Once in the "Hold" mode, the operator must press the key again to "Resume" the operation that was interrupted. This key is also used as the "Enter" key for inputting data during programming. The "Home" key repositions the horizontal and vertical masks (i.e. moves them back to a beginning position) to the top left-hand corner of the copyboard panel member 20, or to that "beginning or home" position that has been programmed into the system by the user.

The front panel also includes a display for monitoring program flow and for providing operating mode information. In the preferred embodiment, the display 65 is a Seiko L402 Liquid Crystal Display Module which has two lines of 40 characters each.

The system also includes a foot pedal switching module 66 for interrupting and resuming operation of the system, in the same manner as controlled by the "Enter/Hold/Resume" key of the keyboard 64.

The chassis vertical mounting standard 12b support the computerized electronics and control functions of the system. A primary utility panel for such electronics is generally illustrated at 68. The personal computer (PC) electronics (hereinafter described in more detail) is mounted adjacent to the utility panel 68, and is generally designated at 100. The PC 100 is programmed by the input keyboard 64, to control the activity of the stepper motors 56 and 57. The power supply for the electronics of the system is illustrated at 69, which is mounted by means of a cooling assembly 70 to the support base 12a. In the preferred embodiment, the power supply 69 is a 50 watt power supply which supplies all power needed to operate the electronics, the lights and the fan. The system also includes an auxiliary panel 71 which contains power and light surge protection, additional auxiliary power supply outlets, surge reset switches and the connector member for interfacing with external keyboards and computer systems. Access to the auxiliary panel 71 is provided through an opening in the rear of the outer cover 14, as previously described.

Figure 8:
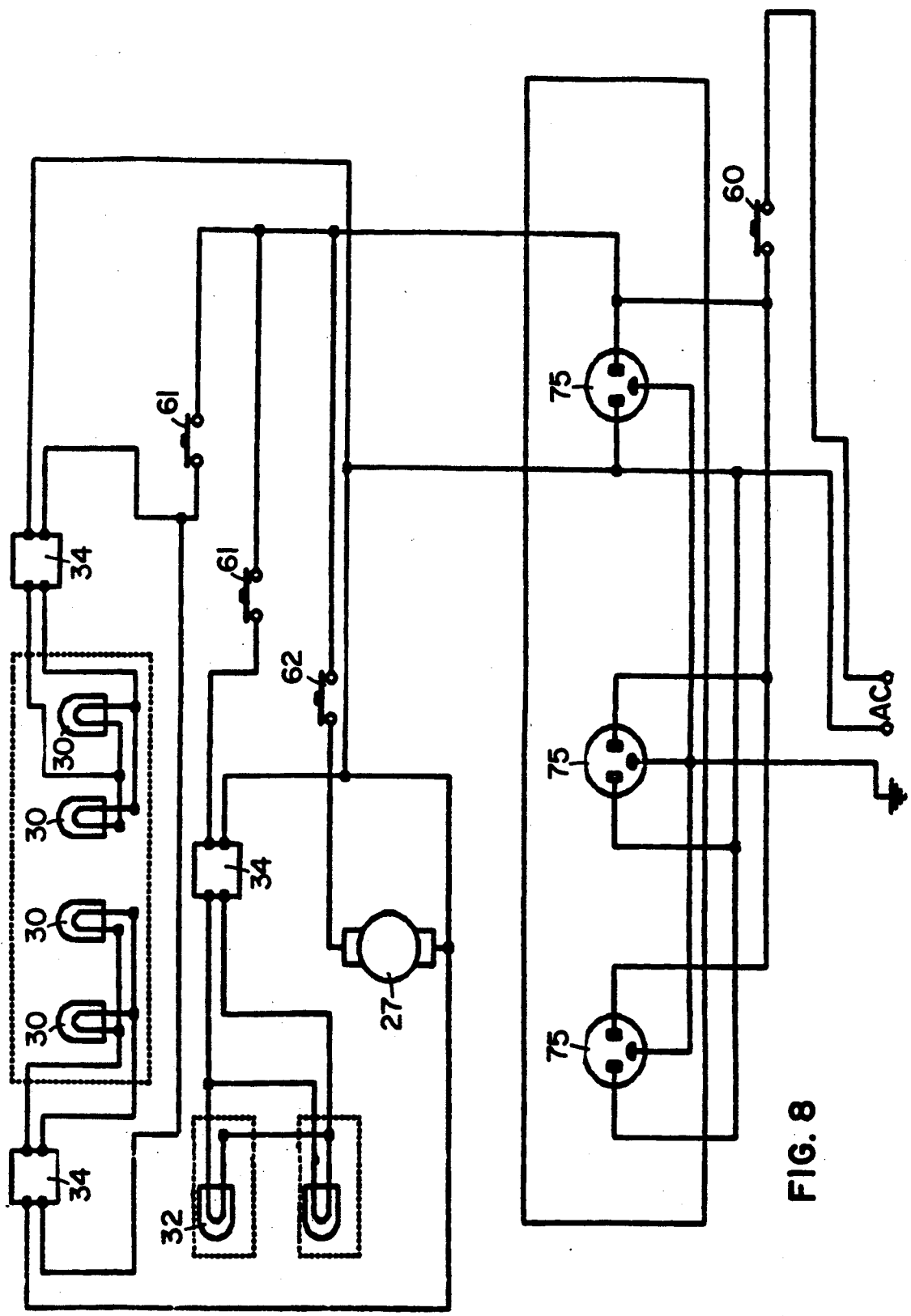
FIG. 8 is an electrical schematic diagram of the alternating current circuitry of the apparatus disclosed in FIGS. 1 through 7.

The electronical schematic diagram for the AC circuitry of the system is generally illustrated is FIG. 8. The circuit connections are straight-forward and typical of such light and switch connections, and will not be labored herein. All elements of the circuit have been previously discussed, except for the input and output plug terminals, which represent auxiliary input and output connections for energizing external auxiliary equipment through the system's power supply.

Figure 9:
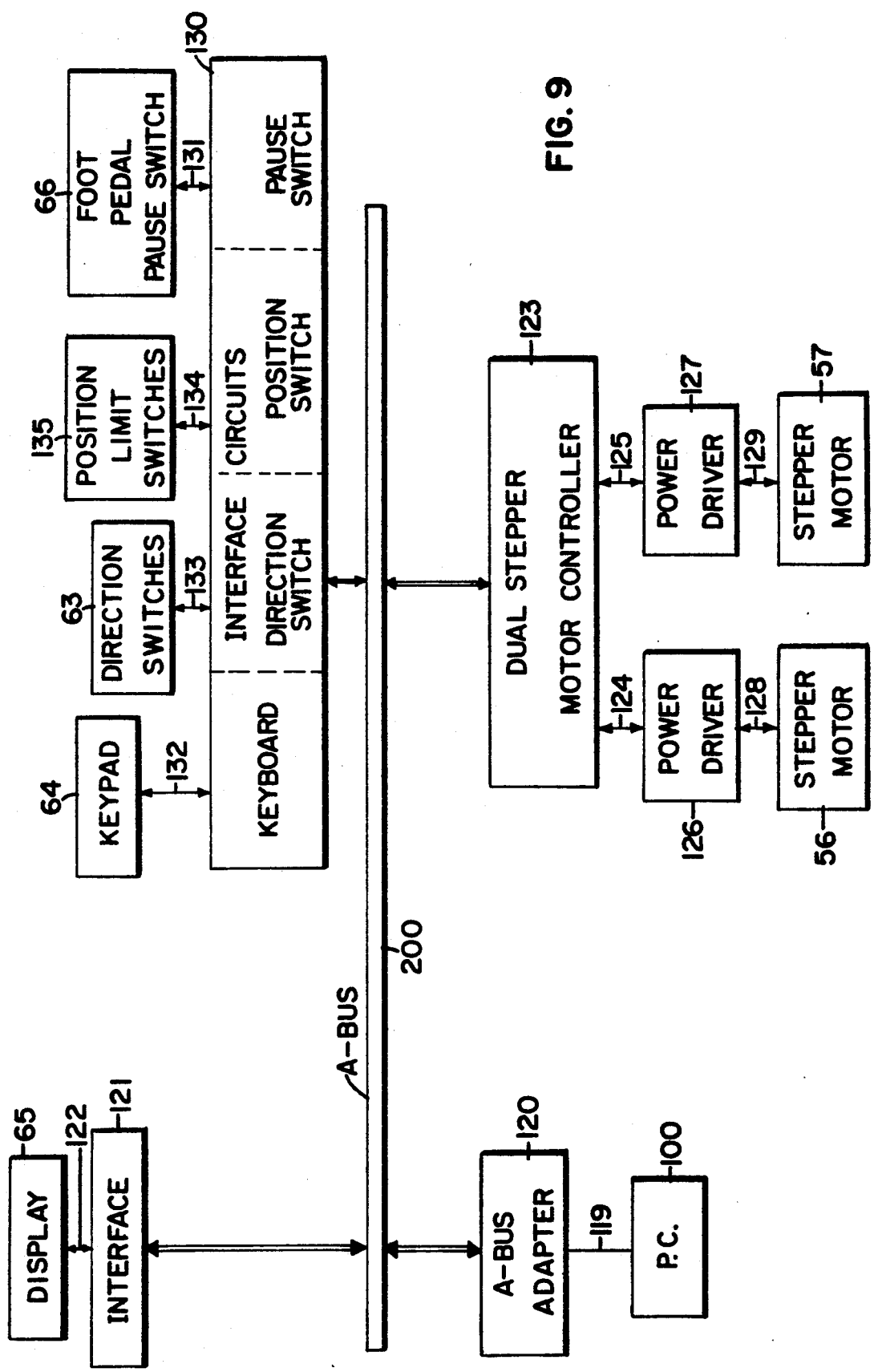
FIG. 9 is a functional block diagram illustrating the primary functional blocks of the electronic control portion of the text scanning apparatus disclosed in FIGS. 1 through 8.

The architecture of the electronic control portion of the system is based on a controller system, manufactured by Ampro Computers, Incorporated of Sunnyvale, Calif. commonly known as the AMPRO Little Board/PC, which provides functionality of an IBM Personal Computer (PC) for embedded applications. The various components of the AMPRO Little Board/PC system, their operation and function, and step by step guides for programming and using the system are well documented by Ampro Computers, Inc., and will not be specifically set forth herein. Such documentation is quite voluminous and readily available to those interested in such documentation, or to those desiring to familiarize themselves with details of operation and application of the Ampro Computers, Inc. technology. To the extent that such information is desirable or required for a more complete understanding of the present invention, it is hereby incorporated by reference. It is contended, however, that such detailed information need not be specifically included in this specification, since those skilled in the art of computer and controller applications will readily understand from the summary description included herein, how to apply such technology to the principles of this invention as herein set forth. In general, the Little Board/PC 100 is operatively connected to a number of functional circuit modules (as illustrated in FIG. 9) through an Interface Adapter Circuit 120 which converts the PC bus signals to A-BUS signals. The A-BUS is an 8 bit bus which is treated as an extension to the PC 100 bus.

Referring to FIG. 9, the PC 100 Bus is generally illustrated as connected by means of the signal flow path 119 and the A-BUS adapter network 120 to the A-BUS, generally designated at 200. The A-BUS 200 is connected by means of a 24 line Digital I/O Interface Circuit 121 and the signal flow path 122 to the liquid crystal Display output 65. The A-BUS 200 is also connected by means of a Dual Stepper Motor Control circuit 123 and a pair of signal flow paths 124 and 125 and a pair of associated Stepper Motor Power Driver circuits 126 and 127 and their associated signal flow paths 128 and 129 to the Stepper Motors 56 and 57 respectively.

The A-BUS 200 is also connected by means of common interface circuits of a 24 line Digital I/O Interface Circuit 130. Communication with the Interface Circuit 130 is provided to and from the foot pedal unit 66 by means of a signal flow path 131; to and from the keyboard entry module 64 by means of the signal flow path 132; to and from the plurality of Direction Switches 63 by means of the signal flow path 133; and to four Position Limit Switches, generally indicated at 135, by means of the signal flow path 134.

The PC 100 is in the preferred embodiment, a Little Board/PC, as previously described, and has an 8088-compatible microprocessor based unit manufactured by Intel, with a full complement of on-board RAM, EPROM, and I/O ports—as fully described in the "Ampro Computers, Incorporated, Little Board/PC Model 4B Technical Manual." The text scanning application of this invention utilizes the Little Board/PC apparatus with an MS-DOS compatible operating system with an MS-DOS application. Software for the PC 100 is loaded from EPROM on power-up, through an AMPRO-developed ROM disk feature. A block diagram of the Little Board/PC 100, which is a copy taken from the AMPRO technical literature, is illustrated in FIG. 10.

Figure 10:
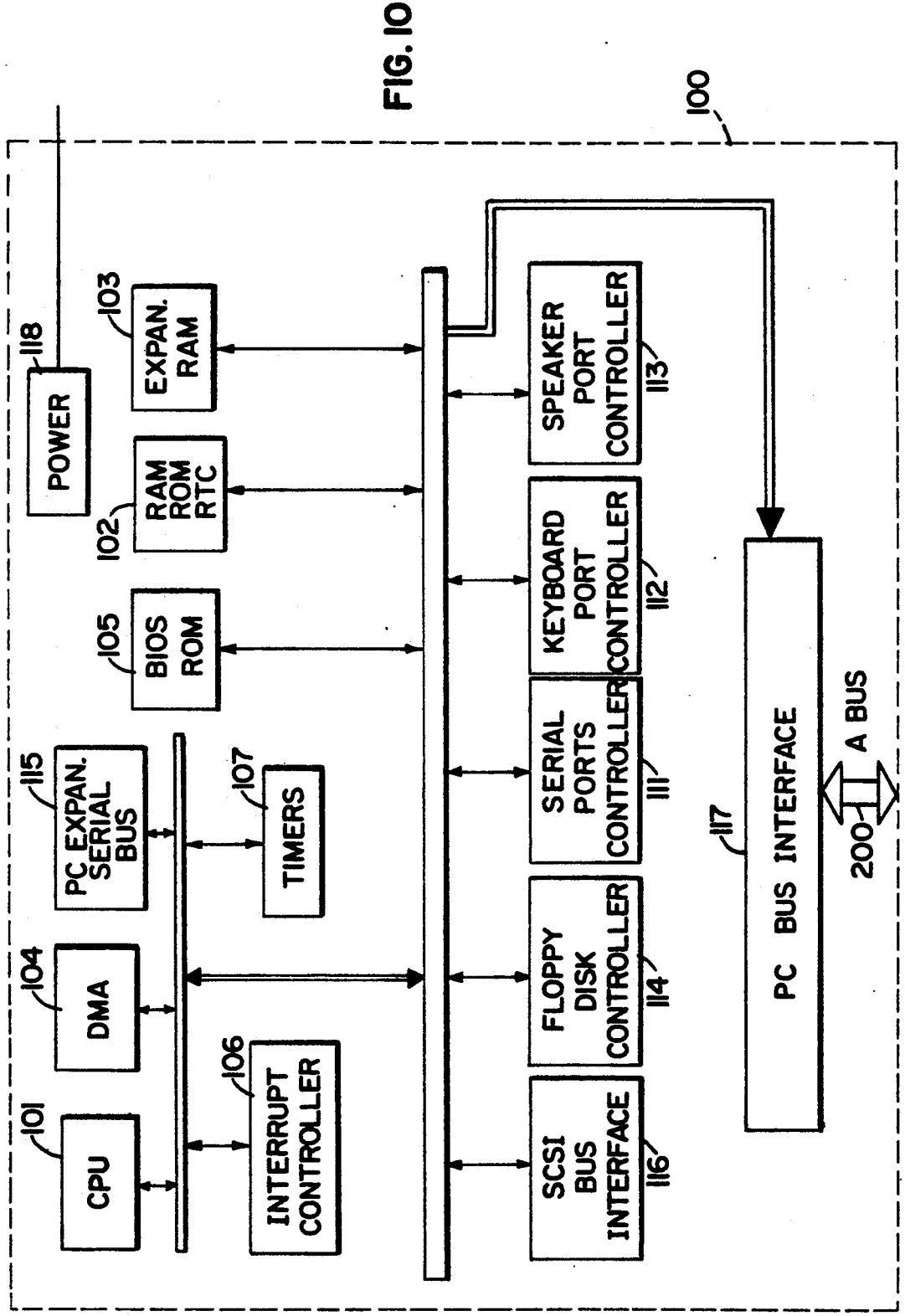
FIG. 10 is a functional block diagram illustrating the primary circuit functions of the PC functional block of FIG. 9.

Referring to FIG. 10, PC 100 is indicated as having a Central Processing Unit (CPU) 101, a RAM/ROM/RTC functional block 102, an Expansion RAM functional block 103, a DMA functional block 104, a BIOS ROM functional block 105, an Interrupt Controller functional block 106, and timing circuitry 107—all directly connected for intercommunication with the internal PC-BUS 110. The PC 100 includes a CMOS NEC V40 on board RAM and EPROM memory and I/O ports. Controllers 111, 112, 113 and 114 are respectively provided for Serial, Keyboard, Speaker and Floppy Disk drives—all communicating with the internal PC-BUS 110. The PC 100 also includes a PC Expansion Bus 115 and a Small Computer System Interface (SCSI) 116—both also in communication with the PC-BUS 110. Communication between the PC-BUS 110 and the A-BUS 200 is provided by means of standard Interface Circuitry, generally indicated at 117. Power for the electronics of the PC 100 is generally provided by means of power circuitry, generally indicated at 118. As indicated above, the above configuration for the PC 100 is common knowledge within the industry, and is fully documented by the AMPRO technical disclosure, specification and application documents.

Optional features that may be included with the Little Board/PC include an AMPRO CMOS video module which can attach directly to the circuit card housing the Little Board/PC. Complete software compatibility and flexibility are assured by the video module's four modes of operation, which include: standard PC monochrome, CGA, Hercules monochrome graphics, and either a double scan (400 line) CGA-compatible mode, or a 40-column monochrome mode. Further additional functions can be added to the system through the PC Expansion Bus 115 which enables additional circuit cards to be physically stacked with the Little Board/PC card. The geometry of the PC allows for easy addition of serial ports, local area networks (LANs), modems, data acquisition and control interfaces, and such other functions as may be desired.

The Little Board/PC 100 of the preferred embodiment contains a PC compatible ROM-BIOS. Standard PC compatible MS-DOS version 3.x is supported as the operating system. Drivers in the ROM-BIOS allow system boot from floppy disk, SCSI device (e.g., hard disk or bubble memory), or "solid state disk" (EPROM or NOVRAM). The solid state disk support offers complete diskless system operation.

The PC 100 software accesses the FIG. 9 circuits connected to the A-BUS 200 by means of the A-BUS Adapter network 120. In the preferred embodiment the Adapter network 120 is a type AR-133 A-BUS Adapter Card of Alpha Products, well known in the industry, and for which applications and circuit configuration data is readily available to those skilled in the art. The Adapter network converts signals on the address and data lines of the PC-BUS 110 to the signals required for processing for those circuits associated with the A-BUS 200. The A-BUS 200 is an 8 bit bus with address decode and card enable logic. The architecture of the A-BUS is described in the product literature of Alpha Products entitled "ALPHA PRODUCTS A-BUS OVERVIEW." Circuitry and specifications for the AR 133 A-BUS Adapter network 120 can be found in the literature of Alpha Products entitled "ALPHA PRODUCTS AR-133 A-BUS ADAPTER USERS'S MANUAL." This document, as are other documents referred to herein for describing circuit configurations of various functional blocks of the system, are incorporated by reference to the extent that such incorporation is necessary for the reader to gain a more complete understanding of the rudiments of such circuits or networks.

Referring to FIG. 9, the PC 100 accesses the liquid crystal Display 65 through the Interface network 121. In the preferred embodiment, the Interface network circuitry 121 is a conventional 24 line digital I/O network of a type DG-148 provided by Alpha Products. This network includes A-BUS decode logic and an INTEL 8255 Programmable Peripheral Interface chip. The liquid crystal Display 65 is an intelligent device, whereby commands are sent over the interface from the host system to the display controller. The PC 100 sends commands to the Display 65 by programming the Interface 121 8255 chip through the A-BUS 200. The display command is written to the 8255's B port. The PC software then manipulates the 8255's C port control lines to transfer the command to the display controller, for updating the Display 65 information.

Figure 11:
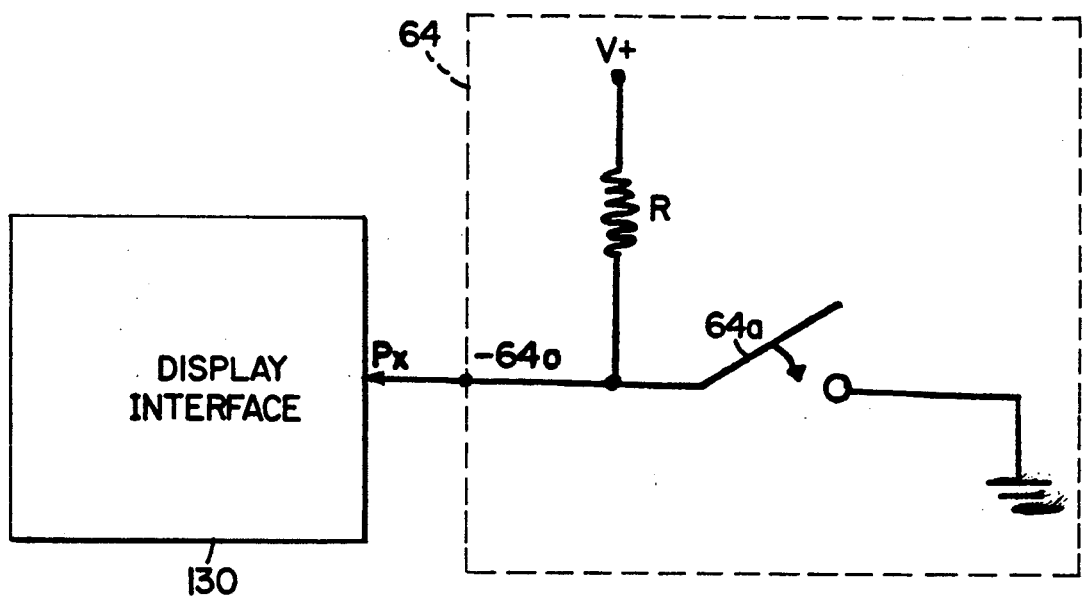
FIG. 11 is an electrical schematic representation of a switch circuit for providing input to the display interface network of FIG. 9.

The keypad 64, Direction Switches 63, Position Limit Switches 135 and the Foot Pedal Switches 66 are sensed by means of the Interface Circuit 130 which also comprises in the preferred embodiment, a type DG-148 24 line digital I/O network of Alpha Products. The PC 100 accesses these switches through the Interface Network 130. The keypad 64 of the preferred embodiment is a Grayhill Series 86 4×4 keypad having a matrix code and truth table. The keypad is sampled by the 8255 chip of the Interface Network 130, as illustrated by the simple schematic of FIG. 11. In FIG. 11, one of the 16 keypad switches is illustrated at 64a as being connected between the V+ positive logic supply and reference or ground potential through the resistor (R). The signal level at the output line 64a-0 output terminal of the keypad 64 is sensed by the Px terminal of the 8255 chip of the Display Interface network 130. The PC 100 software accesses the keypad by outputting patterns to the 8255 chip of the Display Interface network 130 and by reading in the keypad input signals at the Px input terminal, to detect the depression of individual keys of the keypad 64.

Similarly, the PC software samples the status of the Direction Switches 63 and the Position Limit Switches 135 (all of which are discrete switches) through the 8255 chip of the Interface Network 130. As described above, there are four Direction Switches 63 located on the front control panel 16 of the text scanning unit 10. There are also four Position Limit Switches 135 which are mounted to the copyboard mounting frame 12c (not illustrated). Two of the Position Limit Switches 135 are located to intercept the horizontal guide bracket 44 for detecting motion thereof at its extreme limits of travel adjacent the left and right ends of the copyboard panel 20. The remaining two Position Limit Switches 135 are mounted to the copyboard mounting frame 12c to intercept motion of the vertical guide bracket 47 to detect motion thereof between its vertical end limits adjacent the top and the bottom of the copyboard panel member 20. The circuit diagram for detecting the status of the switches 63 and 135 is the same as illustrated in FIG. 11 with respect to the keypad sampling, wherein the keypad switch 64a would be replaced by the appropriate Direction or Position Limit Switches 63 and 135 respectively. The PC 100 software samples the discrete switches by reading the 8255 chip I/O ports and by detecting any changes in the state of the discrete switches. Similarly, the PC 100 software accesses and reads the status of the foot pedal switch 66 by means of the Interface Circuit 133—in manner similar to that previously described with respect to the Direction and Position Limit Switches 63 and 135.

The Stepper Motors 56 and 57 are controlled by the PC 100 through the Dual Stepper Motor Controller network 123 and the pair of Power Driver networks 126 and 127 respectively. The Controller network 123 is a Dual Stepper Motor Controller I/O type ST-143 controller circuit provided by Alpha Products, and generally comprises A-BUS decode logic for decoding signals from the A-BUS 200, and Stepper Motor Drive circuitry. Details for the Controller 123 circuitry is available from Alpha Products. The output signals from the Controller 123 are provided to the two Power Driver networks 126 and 127 which, in the preferred embodiment, are type PD-123 Power Drive Board circuits also provided by Alpha Products. One driver board is used to drive each Stepper Motor, and is generally operable to boost the input signal received from the Controller 123 up to four amps per phase for driving the Stepper Motors 56 and 57. In the preferred embodiment, the Motors 56 and 57 are type MO-104 stepper motors sold by Alpha Products, having step angles of 1.8 degrees or 200 steps per revolution. To control the Motors 56 and 57, the PC 100 sends commands over the A-BUS 200, to the Controller 123, which simply translates such commands to appropriate signals for driving the Stepper Motors 56 and 57.

Program/Operative Control

The text scanning apparatus described above is operational in three different modes and can be controlled by a user by programming the system by means of the input control keypad 64 on the control panel 16, or by a remotely located operator using an interfaced computer terminal. The first mode of operation is the FULL AUTOMATIC MODE, which once initiated, requires no involvement or further input by the user or operator of the system. The second operative mode is the SEMI-AUTOMATIC MODE. In this mode of operation, the user or operator can depress operational keys, or use the foot pedal to reposition the horizontal and vertical masks to specific areas of the text. The third operational mode is the MANUAL MODE. In this mode of operation, the horizontal and vertical masks move only under direction of operator or user inputs to the keypad or to activation of the foot pedal switches.

The software for controlling operations of the PC 100 was developed using standard application information provided by Ampro Computer, Incorporated, in its application note and guidelines for using the Little Board/PC system. While particular routines and subroutines have been implemented by the inventors for implementing an operative text scanning system using the Little Board/PC, it will be understood by those skilled in the art, that many other software programs could equally well be devised to accomplish the claimed features of this invention. Since the particular features of any one subroutine or routine are not critical to practicing this invention, and since others skilled in the art could equally well configure comparable routines to achieve the same purposes, minute details of the programming will not be provided herein, it being understood that those skilled in the art will readily appreciate many ways to implement programming that performs the general functions described by the inventors—to operatively practice this invention.

The software programs hereinafter described, interface with the previously described mechanical portions of the text scanning apparatus, and are collectively sensitive to activators, sensors and functionality of the hardware components as well as to the internal and ambient environment of the control circuitry. The combination of the software and hardware provides significant application flexibility, implementation reliability and system expansion capabilities. The below-described programs of the preferred embodiment independently operate the hardware, while simultaneously overseeing and monitoring the software operation and status.

The preferred embodiment of the software includes four primary program portions named: the EXECUTIVE program, the DISPLAY DEVICE DRIVER program, the KEYBOARD DEVICE DRIVER program and the MAIN OBJECT. These primary programs are summarized below.

The EXECUTIVE program routine arranges the tasks and functions of operations needed to perform required tasks. The EXECUTIVE program generally sets up and synchronizes the activities and functions schedule of the system management clock and then delegates the various tasks to appropriate programs at the designated times for execution.

Upon system initialization, the system time is established, and procedures and times are initialized to the nearest millisecond. The EXECUTIVE program logically arranges the tasks to be performed and determines the appropriate subroutine or program to which the task will be assigned. The EXECUTIVE program then schedules the routine and dispatches the scheduled tasks to the KEYBOARD DEVICE DRIVER and to the TST-MAIN programs, at the scheduled times. When operating, the EXECUTIVE program receives execution control data whenever a scheduled task has been completed. The timing is checked at least 18.2 times per second to maintain high-precision execution. It will be understood by those skilled in the art, that all PC systems necessarily include an Executive program similar in functional nature to the above-described EXECUTIVE program.

The DISPLAY DEVICE DRIVER program converts simplified instructions to operate the various interfaced hardware components, and converts hardware signals to the specific subroutine program that provided the instruction to the DISPLAY DEVICE DRIVER program. Unlike other programs of the system, the DISPLAY DEVICE DRIVER program is never "scheduled," but only executes when called to do so by the EXECUTIVE program. The DISPLAY DEVICE DRIVER program may be interrupted, as can any task, but must be allowed to complete execution of a particular task before another subroutine is allowed to request further activities to be performed by the DISPLAY DEVICE DRIVER program.

The KEYBOARD DEVICE DRIVER program tests for any status changes before and during task execution. The KEYBOARD DEVICE DRIVER program implements a form of "keyboard debounce" and updates the logic buffer for storage of entered information, and informs the appropriate programs of the system of the changes.

Figure 12:
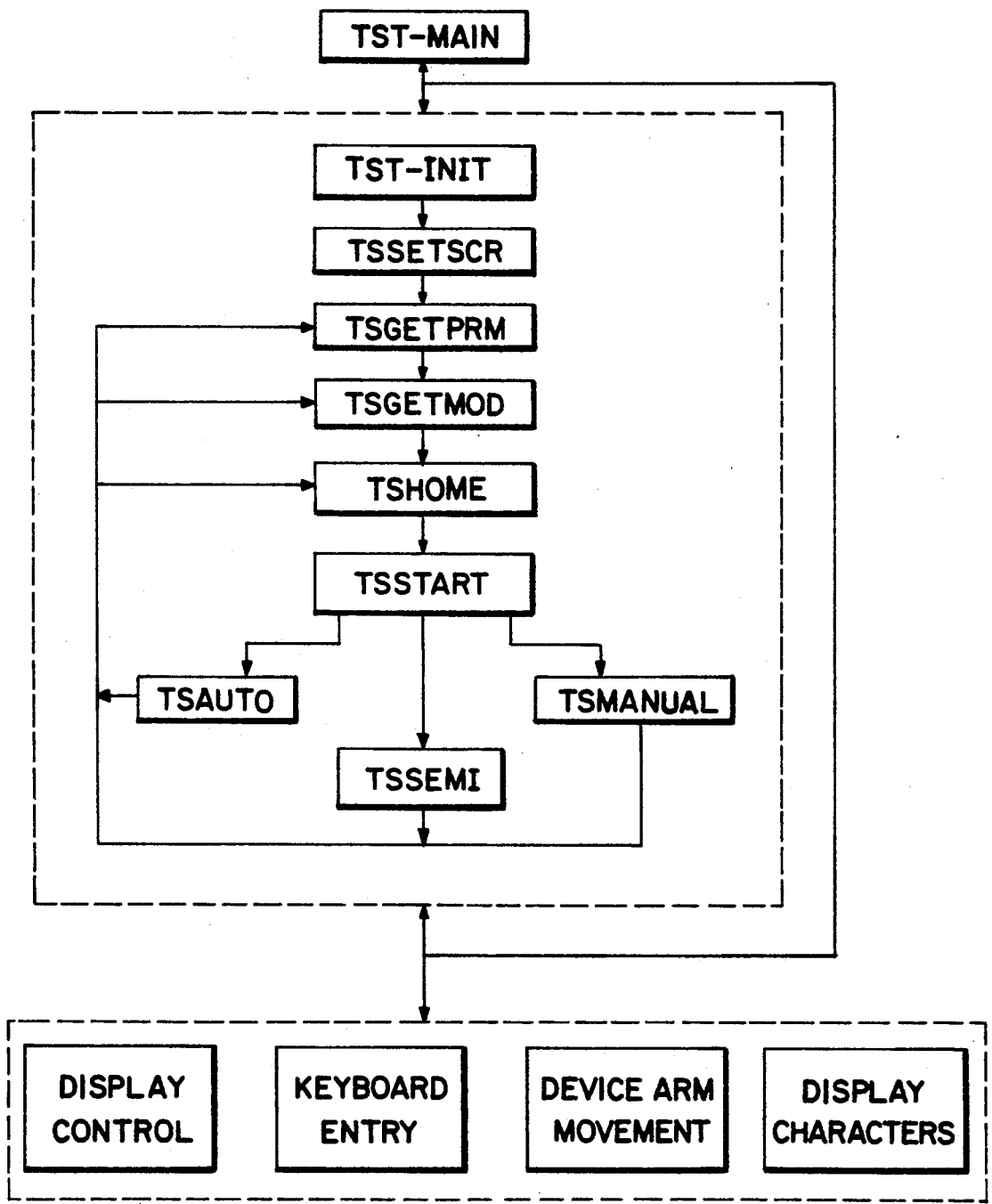
FIG. 12 is a diagrammatic chart illustrating general inter-relation of the TST-MAIN and the subroutines of the MAIN OBJECT program, used in association with the electronic control portion system of FIG. 9.

The MAIN OBJECT program is the application logic program that includes a TST-MAIN program and 13 subroutines that operate the mechanical hardware of the text scanning system. TST-MAIN manages all of the remaining 13 subroutines of the MAIN OBJECT program. Those four subroutines illustrated near the bottom of FIG. 12 are "Utility" routines that service all other programs. The management function of TST-MAIN is implemented as a series of fields passed as common data to the appropriate subroutines. The inputted data from the EXECUTIVE program is initialized along with other data by the first subroutine called by TST-MAIN. Each of the subroutines returns to TST-MAIN, with a prespecified next task to be executed. TST-MAIN executes one series of calls in ascending sequence, then relinquishes control to the EXECUTIVE program for additional system task scheduling to be performed within five millisecond procession. The following are submodules or subroutines of TST-MAIN, and are also indicated in the diagrammatic flow chart of FIG. 12.

TST-INIT (Initialization)

This subroutine prepares and initializes the data areas of the MAIN OBJECT programs, for program execution. It is executed only once per power-up sequence.

TSSETSOR (Set Screen Parameters)

When the optional PC monitor is connected to the text scanning apparatus, this subroutine initializes the internal capacity to display any control information to be displayed on the monitor.

TSGETPRM (Get Parameters)

This subroutine is the controlling module for the text scanning unit operations. It has two optional phases: the selection from a list of 18 sets of parameters; and the specialization of any one of eight parameter sets within the current configuration. The parameter sets include: (1) the page size; (2) the number of lines per page; (3) the number of characters on a line per inch; (4) the number of lines to increment the horizontal mask (in the full or semiautomatic modes); (5) the number of columns to increment the vertical mask (in the full or semiautomatic modes); (6) the number of masks to use (in the full or semiautomatic modes); (7) the time interval for full automatic operation; and (8) the "Home" position. The details of each of these selectable parameter phases, and how the defaults are selected are detailed in the "TEXTSCAN Users Manual." This subroutine is the first to use three of the four Utility Programs (hereinafter described). The three Utility Programs used by TSGETPRM are: the Display Control Utility Program, which is used to place the cursor in the display for input; the Keyboard Entry Utility Program which is used for parameter entry by the operator; and the Display Character Utility Program which is used for display of the parameter prompt and the resulting parameter data.

TSGETMOD (Get Mode)

This subroutine is executed after the TSGETPRM subroutine, or a restart return after the TSAUTO, TSMANUAL or TSSEMI subroutines (see FIG. 12). This subroutine uses the Utility Programs to control the display, the prompt user input and to select a mode from the user input. Possible modes of operation are: the Automatic mode; the Semiautomatic mode; and the Manual mode of operation.

TSHOME (Move to Home Position)

This subroutine uses the Device Arm Movement Utility Program subroutine to move the mask to the full upper left positions for both the horizontal and vertical masks. The masks are moved until the Position Limit Switches 135 indicate the successful travel to the "Home" position. Unlike the previous subroutines, this one does not surrender its control to the EXECUTIVE program, periodically. Because smooth operation of the masks requires 200-300 timed commands to the stepper motors, TSHOME controls the masks, tests the position switches and instructs the KEYBOARD DEVICE DRIVER program to test for keyboard actions—all without exiting to the EXECUTIVE program. When the desired position is reached, or a key entry is sensed, the action is terminated and normal real-time operation is resumed.

TSSTART (Move to Start Position)

This subroutine is similar to the previous subroutine in that it contains the complete operation of the masks. In addition, if the entered parameters indicate only one mask operation, only that mask is moved from the "home" position. When the "start" position is achieved, the program returns to normal real-time operation. The next task selected for execution depends on the previous selected mode parameter (see previous subroutine TSGTMOD).

TSAUTO (Automatic Operation)

This subroutine uses the parameter entered by the TSGETPRM subroutine to move the mask(s) in the selected manner. As with the previous subroutine, while the masks are moving, TSAUTO maintains total control. However, because each movement cycle contains a selected delay (of at least zero seconds) the EXECUTIVE program does obtain control with each cycle. TSAUTO performs a movement cycle, delay, cycle, delay, etc., until the mask(s) has made one full travel as selected, and the maximum travel switch (135) is sensed. The mask then travels to the "Home" position and the TSHOME subroutine is initiated.

TSSEMI (Semiautomatic Operation)

This subroutine executes in a similar manner to the TSAUTO subroutine previously described, except that selection of a down operation, an entry at the keyboard, or a pedal action causes the reverse action cycle to execute.

TSMANUAL (Manual Operation)

This subroutine executes the masks one character left or right, or one line up or down, based on the selection of the up, down, left or right operation switches (63).

Display Control Utility Program

This program is available to all of the other programs and subroutines. It contains logic interfaced to the DISPLAY DEVICE DRIVER program to control the Display 65 and to control maintenance of the Display 65. It provides for all cursor movements, screen erasers and other manipulations.

Keyboard Entry Utility Program

This program is available to all other programs and subroutines. It contains logic interfaced to the KEYBOARD DEVICE DRIVER program to read the keypad 64, logic to read the optional maintenance keyboard, logic to test for the "deadman" switches of the foot pedal (66) and at both ends of travel of the mask (switches 135). In addition, logic is contained in this program to monitor the optional RS-232 interface to outside control devices, such as separate personal computers where the keystrokes, parameter selections, etc., are inputted as if it was itself being operated by an operator at the keypad 64 of the text scanning unit 10. The following are input routines that are available to this program: Test Keyboard; Test Pedal; Enter Character; Enter Integer; and Enter Fixed Point Field.

Device Arm Movement Utility Program

This program contains the logic to move one or both of the horizontal or vertical masks in a prescribed manner. Depending on the hardware configuration, the movement of the Stepper Motor 56 or 57 might result in a certain movement of a mask. The exact specification of these movements is precalculated and loaded by the initialization subroutine TST-INIT. The Stepper Motor is allowed a certain amount of time to reach the requested position. That position must be reached within the specified time limit before the next step is executed. The program contains logic to allow these optimum movements to be reached. In addition, logic is contained such that the requested mask travel distance is translated to the Stepper Motors. Recording current and previous movements provides the capability of illuminating the present status on the optional maintenance display.

Display Character Utility Program

This program provides the interface to the DISPLAY DEVICE DRIVER program and to the optional maintenance display. This program is available to all of the programs and subroutines.

Operation of the above-described system is straightforward. An operator need simply to turn on the System Power Switch 60 to initialize a power-up sequence. The operator can select the proper light desired to be cast on the copyboard panel 20 by means of the light selection switch 61 and can energize the fan motor 27 by means of the fan control switch 62. Thereafter, the operator is automatically prompted by means of the Display 65. The operator can select one or as many as eight of the selectable parameters, previously described, as prompted by the Display 65. Following the selection of the parameters, the display will ask the operator to select one of the three modes of operation: Fully Automatic; Semiautomatic; or Manual. The system is then ready for operation. The operator simply places a document or sheet of material to be scanned on the copyboard surface 20 by placing the paper on the copyboard surface such that its upper left-hand corner registers with and is self-aligned by means of the rectangular alignment recess 22. If the fan motor 27 is energized, the placed sheet material will automatically be drawn into uniform secure engagement along its entire back surface, to the copyboard surface by means of the vacuum grooves 23. After selection of the desired mode of operation, the operator simply presses either the "enter" key or the foot pedal to begin operation in that mode.

In the Fully Automatic mode, the horizontal and vertical masks will automatically move in timed-incremented fashion until they have sufficiently traversed the document being scanned, in the manner as preselected by the operator. For example, when scanning a document for purposes of retyping the information into a keyboard, the horizontal mask 40 will highlight horizontal text on a document held on the copyboard surface 20 for a predetermined period of time, and will then move in incremental manner to highlight the next line of text. Simultaneously, the vertical mask will move horizontally across the page in timed manner as preselected by the operator, to highlight text or letters or positions along the horizontally highlighted line. When the vertical mask 42 reaches the end of its preselected travel across the page, the appropriate Position Limit Switch 135 will be energized to cause return of the vertical mask to its beginning-of-the-line position. As the horizontal mask increments to the next line, the vertical mask will be in a position to resume its horizontal scanning of the next highlighted of line information. Following completion of traversal (or scanning) of the entire document, energization of the appropriate Position Limit Switches 135 at the end of such scanning, will automatically cause both the horizontal and vertical masks to return to their original start (i.e., "home") positions, where they will be ready to scan the next document. The operator then simply replaces the already scanned document with a new document and resumes operation by depressing either the "enter" key or the foot pedal.

In the semiautomatic mode of operation, the operator initiates the system by depressing either the "enter" key or the foot pedal. Upon initiation, the apparatus will perform one preprogrammed cycle and will stop. The masks will not advance to their next position until the operator reactivates the program by depressing either the "enter" key or the foot pedal. Upon completion of scanning of the document, energization by the operator for the next cycle will cause the masks to return to their "home" positions.

When functional in the Manual mode of operation, operation of the system is entirely controlled by the operator by continuously depressing or energizing the appropriate switch (i.e., the Directional Switches 63, the foot pedal 66 or the "enter" key).

Changing between modes of operation can be performed at any time by simply pressing the appropriate newly desired mode selection key on the keypad 64. Similarly, the operator can pause or interrupt operation of any program by depressing the "hold" key or the foot pedal. In such instances, the system will wait for a subsequent reactivation signal from the operator either by means of the "resume" key or the foot pedal.

While a specific embodiment of the invention has been disclosed, it will be understood that such disclosure has been merely for the purpose of illustration and that the invention is not to be limited in any manner thereby. Various modifications of this invention will be apparent to those skilled in the art, in view of the foregoing example. The scope of the invention is to be limited only by the appended claims.

What is claimed is:

1. A text scanning apparatus, comprising:
   A. support surface means for retainably holding a sheet of text-containing material;
   B. first mask mans operatively connected to said support surface means for moving along a first axis relative to said sheet held thereby; said first mask means being arranged and configured to align with and to isolate said text generally along a first direction across said sheet;
   C. second mask means operatively connected to said support surface means for moving along a second axis, generally orthogonal to said first axis, relative to said sheet held thereby; said second mask means being arranged and configured to align with and to isolate said text generally along a second direction across said sheet;
   D. first drive means operatively connected with said first mask means for moving said first mask means in timed incremental manner in the direction of said first axis;
   E. second drive means independent of first drive means, operatively connected with said second mask means for moving said second mask means in timed incremental manner in the direction of said second axis; whereby said first and said second mask means cooperatively move in timed sequence to isolate blocks of said text of said sheet; and
   F. programmable control means operatively connected with said first and said second drive means for enabling programmable control of said first and said second drive means, whereby said first and said second mask means are moved in response to a pre-programmed pattern of movement from said programmable control means.

2. The text scanning apparatus as recited in claim 1, wherein the timed incremental movement of said second mask means is of a nature such that said second mask means appear to continuously move in the direction of said second axis.

3. The text scanning apparatus as recited in claim 1, wherein said programmable control means includes means for selectively operating said first drive means in automatic, semiautomatic or manual modes of operation.

4. The text scanning apparatus as recited in claim 1, wherein said programmable control means includes means for selectively operating said first and said second drive means in automatic, semiautomatic or manual modes of operation.

5. The text scanning apparatus as recited in claim 1, wherein said first drive means includes first stepper motor means operatively connected with said first mask means for controllably moving said first mask means; and wherein said second drive means includes second stepper motor means operatively connected with said second mask means for controllably moving said second mask means.

6. The text scanning apparatus as recited in claim 5, wherein said programmable control means operatively connected with said first and said second stepper motor means for programmably controlling energization of said first and said second stepper motor means.

7. The test scanning apparatus as recited in claim 6, wherein said programmable control means includes programmable micro-controller circuitry.

8. The test scanning apparatus as recited in claim 6, wherein said programmable control means includes an operator input keypad means mounted to said support surface means for receiving operator input selections, and a visual output display for displaying the input selections made to said input keypad means and for monitoring program execution by said programmable control means.

9. The text scanning apparatus as recited in claim 6, wherein said programmable control means includes means for receiving programmable selection of the number of lines of text per page, of the page size, of the number of characters per inch on a text line, and the number of lines for incrementing the first drive means to move the first mask means.

10. The text scanning apparatus as recited in claim 9, wherein said programmable control means includes means for receiving programmable selection of the number of columns for incrementing the second drive means to move said second mask means.

11. The text scanning apparatus as recited in claim 6, wherein said programmable control means includes recall memory for successively repeating said pre-programmed pattern of movement of said first and said second mask means relative to said sheet.

12. The text scanning apparatus as recited in claim 6, wherein said programmable control means includes means for selectively operating said first drive means in automatic, semiautomatic or manual modes of operation.

13. The text scanning apparatus as recited in claim 1, wherein said support surface means includes an upright chassis configured to rest on a horizontal surface, said chassis defining a generally planar copyboard for engagably supporting said sheet in a generally upright manner relative to said horizontal surface.

14. The text scanning apparatus as recited in claim 13, wherein said chassis further includes vacuum means operatively connected with said copyboard for uniformly retainably holding said sheet in snug engagement against said copyboard.

15. The text scanning apparatus as recited in claim 13, wherein said upright chassis further includes light means for fully illuminating the sheet support by said copyboard.

16. The text scanning apparatus as recited in claim 15, wherein said copyboard is of light translucent material, and wherein said light means includes a first light positioned behind said copyboard for illuminating the sheet supported by the copyboard, through said copyboard.

17. The text scanning apparatus as recited in claim 16, wherein said light means includes a second light positioned forward of the general plane of said copyboard for illuminating that surface of the sheet held thereby which is not in engagement with said copyboard.

* * * * *